(12) United States Patent
Shahindoust et al.

(10) Patent No.: US 7,126,712 B2
(45) Date of Patent: Oct. 24, 2006

(54) FILE BASED REQUEST QUEUE HANDLER

(75) Inventors: Amir Shahindoust, Laguna Niguel, CA (US); Michael Yeung, Mission Viejo, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1192 days.

(21) Appl. No.: 10/112,222

(22) Filed: Mar. 29, 2002

(65) Prior Publication Data

US 2003/0184795 A1    Oct. 2, 2003

(51) Int. Cl.
G06F 15/82    (2006.01)
(52) U.S. Cl. ...................................... 358/1.15
(58) Field of Classification Search ................ 358/1.15
See application file for complete search history.

(56) References Cited

U.S. PATENT DOCUMENTS

| | | | |
|---|---|---|---|
| 4,441,163 A | 4/1984 | Leikam et al. | |
| 4,466,065 A | 8/1984 | Advani et al. | |
| 4,807,111 A | 2/1989 | Cohen et al. | |
| 5,040,031 A | 8/1991 | Hayashi | |
| 5,388,196 A | 2/1995 | Pajak et al. | |
| 5,557,744 A | 9/1996 | Kobayakawa et al. | |
| 5,596,725 A | 1/1997 | Ferguson et al. | |
| 5,619,649 A | 4/1997 | Kovnat et al. | |
| 5,761,396 A | 6/1998 | Austin et al. | |
| 5,805,922 A | 9/1998 | Sim et al. | |
| 5,812,995 A | 9/1998 | Sasaki et al. | |
| 5,822,780 A | 10/1998 | Schutzman | |
| 5,850,536 A * | 12/1998 | McLain, Jr. ................. | 703/21 |
| 5,873,659 A | 2/1999 | Edwards et al. | |
| 5,890,208 A | 3/1999 | Kwon | |
| 5,946,458 A | 8/1999 | Austin et al. | |
| 5,963,968 A | 10/1999 | Warmus et al. | |
| 5,970,224 A * | 10/1999 | Salgado et al. ............ | 358/1.16 |
| 5,983,292 A | 11/1999 | Nordstrom et al. | |
| 5,991,514 A | 11/1999 | Nielsen | |
| 5,995,721 A | 11/1999 | Rourke et al. | |
| 6,069,624 A | 5/2000 | Dash et al. | |
| 6,098,072 A | 8/2000 | Sluiman et al. | |
| 6,105,044 A | 8/2000 | DeRose et al. | |
| 6,145,061 A | 11/2000 | Garcia et al. | |
| 6,173,378 B1 | 1/2001 | Rozario et al. | |
| 6,175,839 B1 | 1/2001 | Takao et al. | |
| 6,185,550 B1 | 2/2001 | Snow et al. | |
| 6,213,652 B1 | 4/2001 | Suzuki et al. | |
| 6,252,681 B1 | 6/2001 | Gusmano et al. | |
| 6,269,382 B1 | 7/2001 | Cabrera et al. | |
| 6,279,006 B1 | 8/2001 | Shigemi et al. | |
| 6,292,267 B1 | 9/2001 | Mori et al. | |
| 6,311,252 B1 | 10/2001 | Raz | |

(Continued)

Primary Examiner—Kimberly Williams
Assistant Examiner—Jacob P. Rohwer
(74) Attorney, Agent, or Firm—Tucker Ellis & West LLP (57) ABSTRACT

A system and method is provided for providing a file based job request queue for digital imaging devices. Job requests are stored in a section of file-based queue having a plurality of sections, wherein each section corresponds to a function of a multi-function digital image device. A key is assigned to each job request such that each job request in a section has a different key. Values are then computed for each job request based on the assigned job request key. The computed values are then stored such that they are searchable to determine the current state of the queue.

31 Claims, 5 Drawing Sheets

U.S. PATENT DOCUMENTS

| | | |
|---|---|---|
| 6,324,551 B1 | 11/2001 | Lamping et al. |
| 6,330,572 B1 | 12/2001 | Sitka |
| 6,343,351 B1 | 1/2002 | Lackman et al. |
| 6,347,341 B1 | 2/2002 | Glassen et al. |
| 6,592,275 B1 * | 7/2003 | Aihara et al. ................ 400/62 |
| 6,804,815 B1 * | 10/2004 | Kerr et al. .................. 718/100 |
| 6,906,813 B1 * | 6/2005 | Tuchitoi et al. ............ 358/1.14 |
| 2001/0013954 A1 * | 8/2001 | Nagai et al. ................ 358/444 |
| 2003/0076526 A1 * | 4/2003 | Gopalan .................... 358/1.15 |

* cited by examiner

FILE BASED REQUEST QUEUE HANDLER

BACKGROUND OF THE INVENTION

This invention pertains generally to handling request queues, and more specifically to a method and system for providing and handling a file based queue in environments incapable of accommodating Registry functions.

Digital imaging devices ("DID") are complex machines that require administration attention. DIDs suitably include devices such as printers, fax machines, scanners, copiers, multi-function peripherals ("MFPs"), and other like peripheral devices. In the past, embedded systems for controlling and monitoring devices were deployed as firmware. Firmware is software stored in read-only memory ("ROM") or programmable ROM ("PROM") and is easier to modify than hardware but harder to modify than software stored on disk. Therefore, when embedded systems were implemented and deployed as firmware for specific microprocessors, changing the microprocessor often required that the software be significantly rewritten, and sometimes completely rewritten. As personal computers ("PCs") became a practical platform for embedded systems, different operating systems ("OS") could be used with the same hardware, while making available a great number of services specific to the OS. However, choosing from the available OS is not an easy task, as characteristics like stability, robustness, performance and cost must be considered. Although additional functionality is created by the OS, a change in OS still requires the rewriting of software to address changes in the operating system. While this is an improvement over firmware, it is still difficult to change from one OS to another.

Because DIDs are often capable of performing a variety of functions, DID controllers must have the ability to monitor the different types of jobs which the DIDs are capable of performing. Some operating systems, such as the Microsoft Windows family of OS, provide developers with a simple method of monitoring DID jobs. Different OS provide developers with different means for storing configuration settings. However, the means for configuring DIDs under one OS may be very different than the means for configuring DIDs under another OS. Due to this inherent problem associated with the configuration of devices for multiple OS, it would be preferable if there existed a portable and universal system and method for monitoring and organizing DID jobs which provided the same functionality when used with any OS.

BRIEF SUMMARY OF THE INVENTION

The present invention disclosed and claimed herein, in one aspect thereof, comprises a method for handling job requests for a multi-function digital image device. The method comprises the steps of storing job requests in a section of a file-based job request queue that has a plurality of sections and assigning a job request key to each job request where the key is unique at least within its section. A value is then computed for each job request from the assigned key and then stored. The stored values are then searched to determine the state of the job request queue.

Also according to the present invention, there is provided a system for storing job requests for a multi-function digital imaging device. The system comprises a file-based job request queue comprising a plurality of sections for storing keys, each section corresponding to a job type, at least one job request key in a section that is unique at least within its section, the job request key representing a job request. The system further comprises a means for assigning a job request key to each job request such that the job request key is unique at least within its section and a means for computing from the job request key a value for each job request. Also in the system is a means for storing the computed values and a means for searching the stored computed values to determine the state of the job request queue.

Further according to the present invention, there is provided another system for storing job requests for a multi-function digital imaging device. The system comprises a file having a plurality of job request sections for storing job requests where each job request section has a header and each stored job request has a key. Also, the system comprises an array for storing a plurality of values computed from keys of stored job requests, a core software component that has functionality for adding job requests to the file and synchronizing the array with the file, and a computation software component that has functionality for computing values from keys of stored job requests.

DETAILED DESCRIPTION OF THE INVENTION

The present invention provides a method and system for implementing a file-based request queue ("RQ") for DIDs that is preferably compatible with a plurality of OS.

Figure 1:
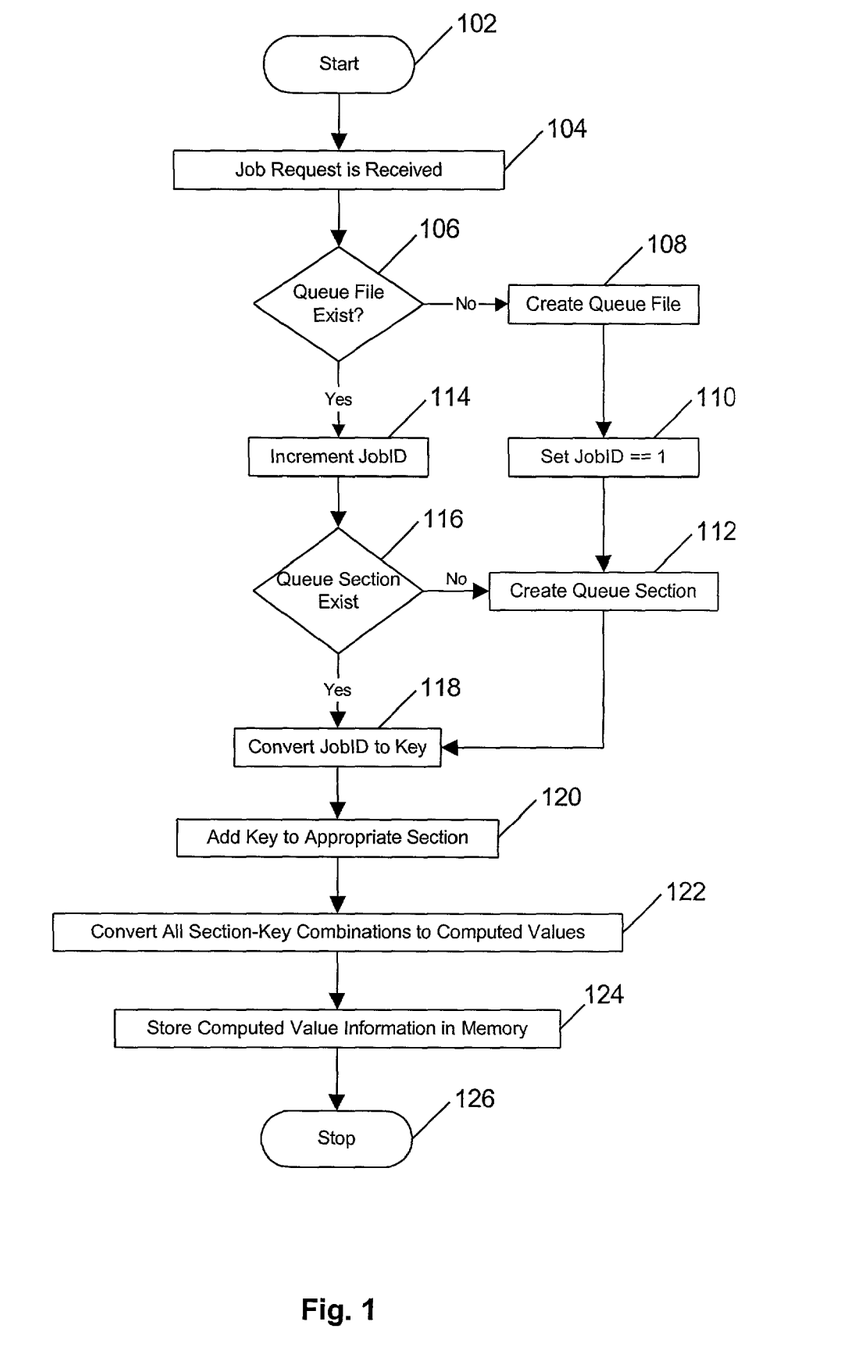
FIG. 1 illustrates an overall block diagram of the subject system for implementing a file-based request queue in connection with the subject invention.

Turning to FIG. 1, an overall block diagram of the subject system for implementing a file-based request queue in connection with the present invention is disclosed. The basic flow commences at start block 102, from which progress is made to process block 104 at which point a job request is received. The request is preferably submitted from a client on a network, but is alternatively sent by an administrator, a software program, such as a word processing program or automation program, or by any other computer or user with access to the DID. The request is preferably submitted to a software module or software component, which resides on a DID and is configured to receive DID job requests.

A job request is a request corresponding to any job that the DID is capable of performing, such as a print request, a fax request, a scan request, or a private print request.

A determination is made at decision block 106 whether a queue file exists for storing the received job request. A negative determination at decision block 106 causes progression to process block 108 wherein a new queue file is created. Preferably, when a new queue file is created, a job value, or JobID, section for storing a job value, or JobID, is created within the file. The JobID section and JobID are preferably used so that each new job request has a unique value or key associated with the job request. In the presently preferred embodiment, the JobID section is the first section of the RQ file and comprises a section header, a key, and a JobID Value. The JobID Value is preferably an integer representation of the unique value that is to be incremented and converted and associated with the job requests. In the presently preferred embodiment, the JobID section of the RQ file reads as follows:

[JobID]

CurrentID=Job Value (e.g., 5)

It will be appreciated by those skilled in the art that any method for creating unique identifiers for job requests is suitably used as an alternative to incrementing a JobID. Alternatively, information stored as a JobID is stored in a separate location or file other than the request queue ("RQ") file.

Progression then continues to process block 110 at which point the newly created JobID is preferably set to the number "1". Flow progresses to process block 112 where a section in the RQ is created for storing the received job request. Progression then preferably flows to process block 118 where the JobID is converted to a key.

A positive determination at decision block 106 means that a RQ file preferably having a JobID already exists, which causes progression to process block 114 where the JobID is incremented. Flow continues to decision block 116 where a determination is made whether a section exists in the RQ for storing a job request of the type received. Preferably, the RQ comprises a plurality of sections, each section preferably corresponding to at least one type of job, such as a print job or a fax job. In the presently preferred embodiment, the RQ comprises a separate section for each type of job request and each section preferably has a section heading or title. A negative determination at decision block 116 causes progression to process block 112 where a section for storing job requests is created. The newly created section is preferably dedicated to the storage of job requests having the same job type as the newly received job request. Progression then preferably flows to process block 118 where the JobID is converted to a key.

A positive determination at decision block 116 also causes progression to process block 118 where the JobID is converted to a key. The key is suitably any representation of a job request such that the job request is unique at least within its section. In the presently preferred embodiment, the key is an eight-digit numerical string that is a hexadecimal representation of the integer value of the JobID.

Progression then continues to process block 120 at which point the key has been generated and is preferably added to an appropriate section of the RQ file. The appropriate section is preferably the section corresponding to the job type of the received job request. At this point, the RQ file contains at least one section that contains at least one key corresponding to the received job request. A section of the RQ file in the presently preferred embodiment reads as follows:

[PrintQ]

00000004

00000005

Flow then continues to process block 122 where the keys of the RQ file are used to create computed values. Each key in each section of the RQ file is preferably used to create a computed value. In the presently preferred embodiment, the computed values are hash codes. The hash codes are preferably computed from both the section heading and the key such that the section heading and the key are combined and then a hash code is computed for the combination. For example, the hash code is suitably computed from the string "PrintQ:00000004".

Progression then flows to process block 124 at which point the hash code or computed value has been generated from at least a key, and preferably from a section and key combination. At process block 124, the computed value is preferably stored in memory. In the presently preferred embodiment, the memory is random access memory ("RAM") or cache memory, but it will be appreciated by those skilled in the art that the memory is also suitably read-only memory ("ROM"). Furthermore, a computed value is preferably generated for each key in the RQ file, often yielding a plurality of computed values corresponding to different types of job requests, such as print requests, scan requests, etc. Therefore, the manner in which the computed values are stored is preferably such that the organizational structure of the RQ file is preserved. The computation of computed values from a combination of the section and key is one method of preserving organizational structure so that the job requests can be recalled.

The presently preferred embodiment preferably stores the computed values in a table or array having three columns: a section and key combination column, a value column, and a hash code column. In the presently preferred embodiment, the computed values are stored in an associative array. The section and key combination column preferably stores the section header and key preferably combined into a single alphanumeric string. The value column preferably stores the incrementing JobID. The value is suitably represented in the table as a number in any form, but is preferably represented in hexadecimal form. In the presently preferred embodiment, the only row of the table with an entry in the value column of the table is the row corresponding to the JobID section and key combination. Table 1 illustrates an example of the contents of the array.

TABLE 1

Contents of Computed Value Table

| JobID:CurrentID | 7 | Computed Value |
|---|---|---|
| FaxQ | | Computed Value |
| FaxQ:00000006 | | Computed Value |
| PrintQ | | Computed Value |
| PrintQ:00000004 | | Computed Value |
| PrintQ:00000005 | | Computed Value |
| ScanQ | | Computed Value |
| ScanQ:00000007 | | Computed Value |

Following the generation of the array or table for storing computed values, flow progresses to termination block 126 where the process ends.

Figure 2:
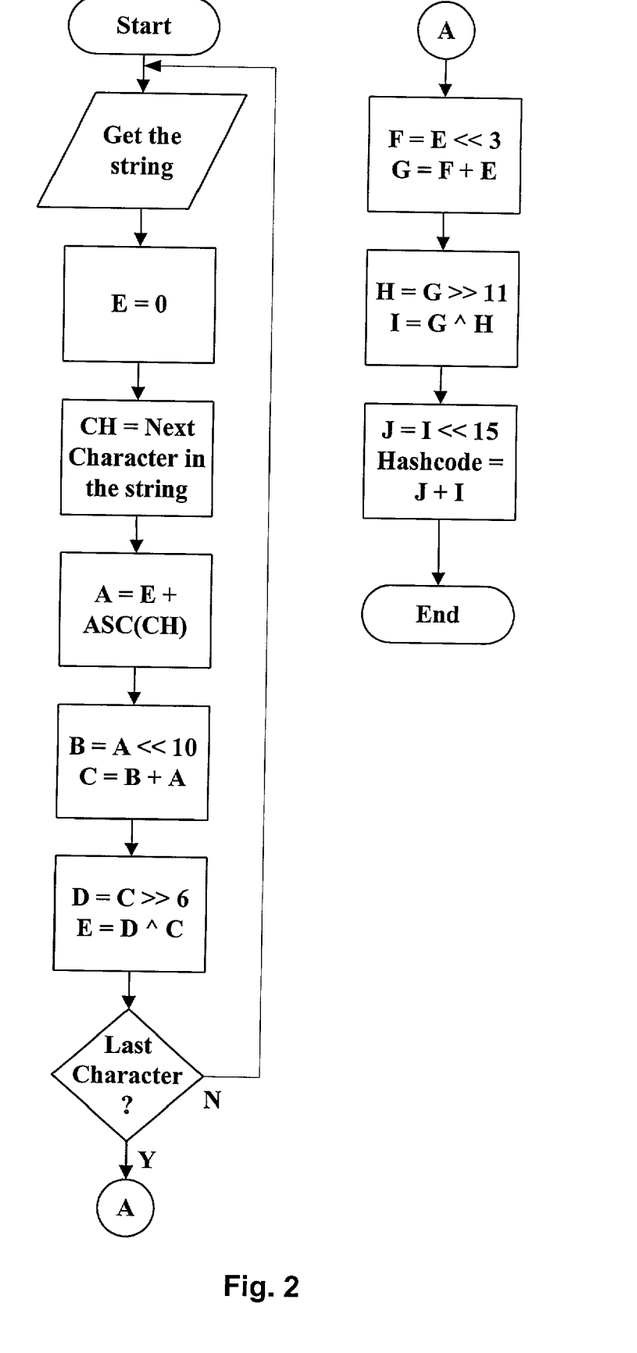
FIG. 2 illustrates a block diagram of a method for performing conversion of information into computed values.

Turning now to FIG. 2, a block diagram of a method for performing conversion of information into computed values. The diagram of FIG. 2 is a standard conversion algorithm for computing hash codes. In general, the hash code algorithm first obtains a string with which to 15 compute the hash code. It then gets the next character in the string which is the first character if this is the first iteration in the loop and converts the character to ASCII code. The ASCII code is then added to the variable and the sum is multiplied by 1024 ($2^{10}$) and added to a variable. The sum is then divided by 64 ($2^6$) and an XOR operation is performed with the result and the variable. If the character was not the last character, the procedure goes back, gets the next character, and repeats the process. After performing the process on all characters, the result is multiplied by 8 ($2^3$) and added to the variable, after which point the result is divided by 2048 ($2^{11}$) and an XOR operation is performed with the result and the variable. Finally, the result is multiplied by 32,768 ($2^{15}$) and then added to the variable to yield the final hash code. It should be appreciated that while the above process represents one method for calculating a computed value or hash code from a text string, other methods are readily available, known to those skilled in the art, and considered within the scope of the present invention.

Figure 3:
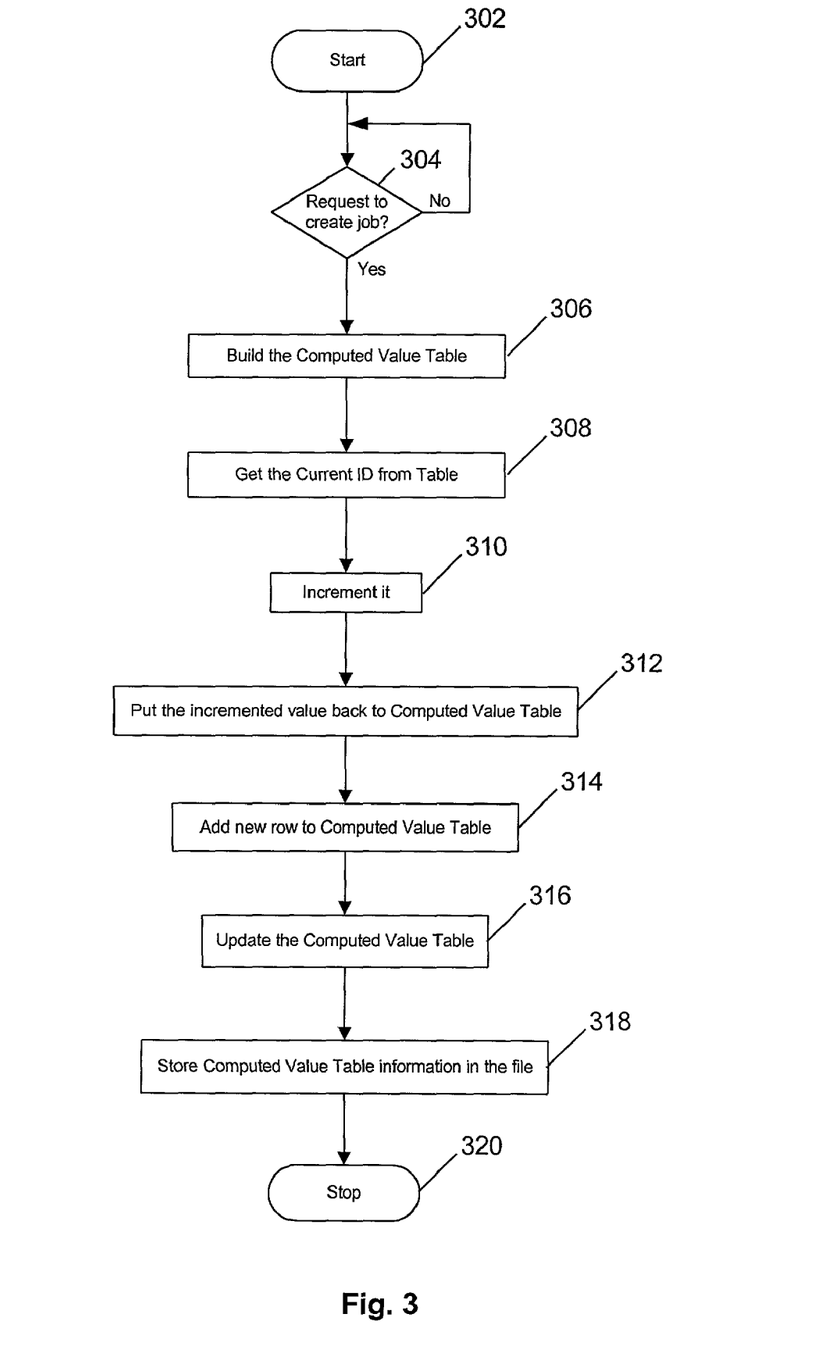
FIG. 3 illustrates a block diagram of a method for adding a job request to a file-based job request queue in accordance with the present invention.

Turning now to FIG. 3, a block diagram of a method for adding a job request to a file-based job request queue (enqueueing) in accordance with the present invention is provided. The basic flow commences at start block 302, from which progress is made to decision block 304. At decision block 304, a determination is made whether the received request is a request to create a job, such as a print job, scan job, fax job, etc. Preferably, a software component makes this determination. A negative determination at decision block 304 means that the received request is not a job request. The request might be, for example, a configuration change request, which would not be added to the job request queue. Therefore, a negative decision creates a loop back to decision block 304.

A positive determination at decision block 304 means that a request to create a job has been received, which causes progression to process block 306 at which point a computed value table or array is built from information contained in the RQ file. Progression continues to process block 308 where the current JobID value is retrieved from the table. Preferably, a software component retrieves the JobID value. Flow then progresses to process block 310 the JobID value is incremented, preferably by a software component. Progression then continues to process block 312 where the incremented JobID value is saved into the table. At this point, the table no longer matches the RQ file because the JobID value has been incremented.

Flow then progresses to process block 314 where a new entry is created in the table. To add a new entry to the computed value table, a new row is added to the table. Preferably, the table is an associative array so that rows are easily inserted in the table. Upon creation of the new entry, the new JobID value is used to generate a key for the new entry. For sections other than the JobID section, the key is preferably an eight-digit hexadecimal representation of the JobID value. As such, each entry in the table, and thus the RQ file, has a key that is unique at least within its section, and preferably within the entire table. The new entry preferably corresponds to the type of job request received and is preferably placed in the appropriate section of the table following the row with the highest key. Progression then continues to process block 316. At this point, a new row corresponding to a new job request has been added to the table, and the table is then updated. It will be appreciated by those skilled in the art that there exist various methods for manipulating data in arrays and while above description is one such example, it should not be considered limiting.

Flow then progresses to process block 318 where the updated table is then used to update the RQ file. In other words, the RQ file is updated with the information from the table using any of the techniques that are known to those in the art. After the RQ file has been updated, flow progresses to termination block 320 where the process ceases.

Figure 4:
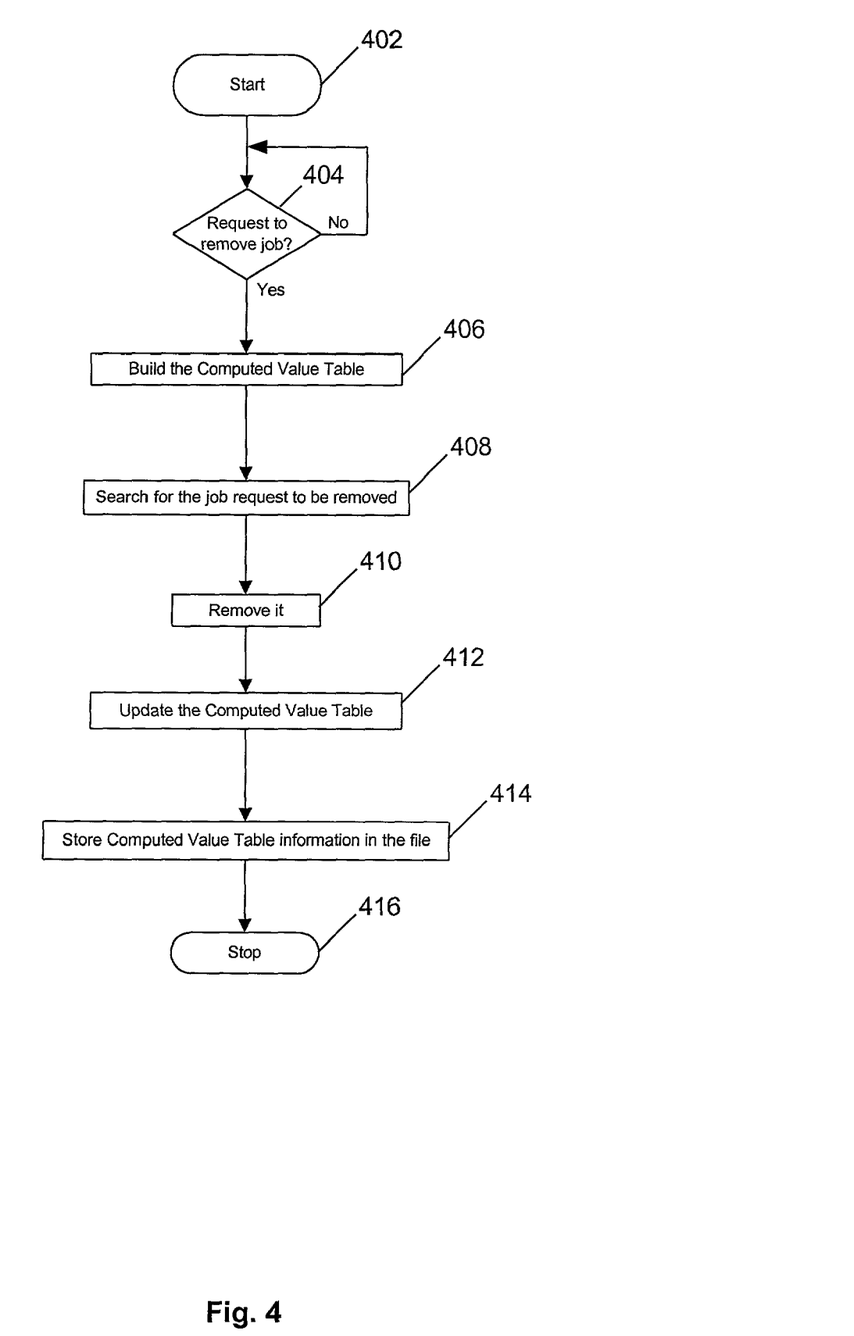
FIG. 4 illustrates a block diagram of a method for removing a request to a file-based job request queue in accordance with the present invention.

Turning now to FIG. 4, a block diagram of a method for removing a job request from a file-based job request queue (dequeueing) in accordance with the present invention is provided. The basic flow commences at start block 402, from which progress is made to decision block 402. At decision block 404, a determination is made whether the received request is a request to remove a job, such as a print job, scan job, fax job, etc. Preferably, a request to remove a job is received upon execution of the job and the determination as to whether the received request is a request to remove a job is made by, a software component. A negative determination at decision block 404 means that the received request is not a request to remove a job. Therefore, a negative decision creates a loop back to decision block 404.

A positive determination at decision block 404 means that a request to remove a job has been received, which causes progression to process block 406 at which point a computed value table or array is built from information contained in the RQ file. Progression continues to process block 408 where a search is performed on the table for the JobID to be removed. Preferably, the search is performed by a software component. For example, if a printer controller has processed a print job and printed it, the received request is suitably a request to remove the processed print job request from the RQ. The software component preferably provides the JobID of the job to be removed so that the job request in the print job section that matches the provided JobID is the entry that is removed. In other words, a search is suitably performed for the print job whose ID matches the given JobID. Preferably, a software component performs the search on the table. The search on the table is suitably performed by finding the computed value corresponding to the section:key combination whose JobID matches the given JobID.

Flow then progresses to process block 410 where the entry is removed from the table. To remove an entry from the computed value table, a row is preferably deleted from the table. Preferably, the table is an associative array so that rows are easily deleted from the table. Progression then continues to process block 412. At this point, a row corresponding to a new job request has been added to the table, and the table is then updated. It will be appreciated by those skilled in the art that there exist various methods for manipulating data in arrays and while above description is one such example, it should not be considered limiting.

Flow then progresses to process block 414 where the updated table is then used to update the RQ file. In other words, the RQ file is updated with the information from the table using any of the techniques that are known to those in the art. After the RQ file has been updated, flow progresses to termination block 416 where the process ceases.

Figure 5:
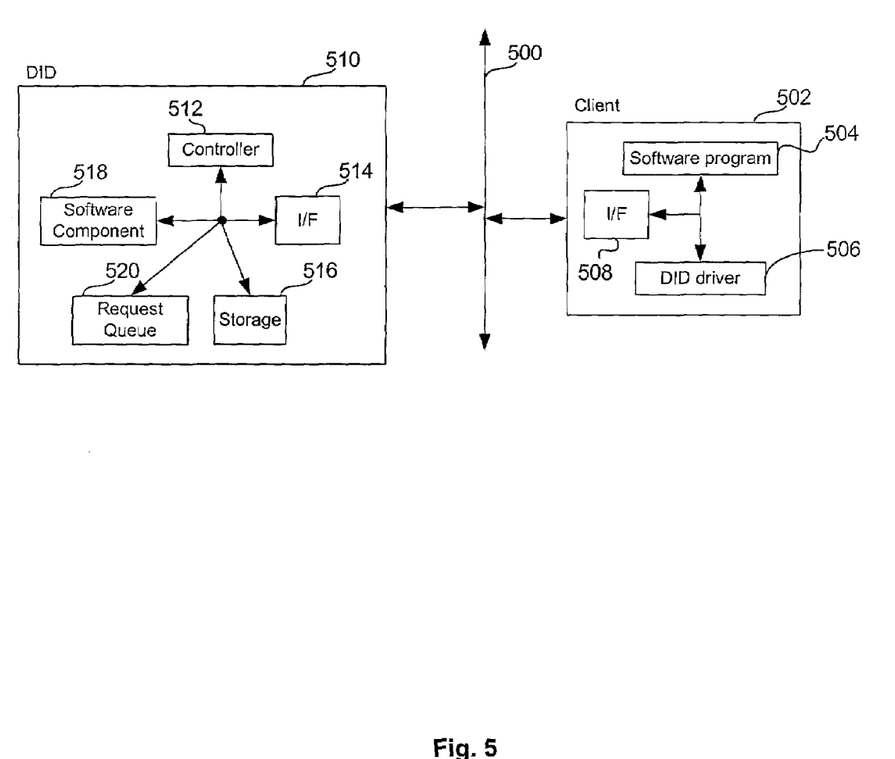
FIG. 5 illustrates an overall system architecture for implementing the present invention.

Turning now to FIG. 5, a system diagram illustrating a DID in a network environment in accordance with the present invention is provided. The system comprises a data transport network 500 illustrative of a LAN or WAN environment in which a preferred embodiment is provided. Connected to a data transport network 500 are a Client 502 and a DID 510. The network 500 is suitably any network and is suitably comprised of physical and transport layers such as illustrated by a myriad of conventional data transport mechanisms such as Ethernet, Token-Ring™, 802.11(b), or other wire-based or wireless data communication mechanisms as will be apparent to one of ordinary skill in the art.

The system preferably comprises a Client, such as that represented by Client 502. The Client 502 is suitably either a Server or Client running sofware are program 504 on any operating system, such as Windows NT, Windows XP, Unix, Linux, Macintosh or other operating system. In addition, the Client 502 is suitably a Thick Client or Thin Client, as will be appreciated by those skilled in the art.

In the presently preferred embodiment, the computer is a Thick Client comprising a processor and storage running connected to a network. The Client 502 is preferably in data communication with a data transport network 500 through a network interface 508. The Client 502 preferably comprises storage, which is preferably a hard disk and random access memory ("RAM"), as will be appreciated by those skilled in the art. Stored on the storage is preferably an operating system for controlling the Client 502.

The DID 510 is also preferably in data communication with a data transport system 500 through a network interface 514. Thus, a data path between one or more DIDs, such as that illustrated by DID 510, is in shared data communication with at least one computer, such as that illustrated by Client 502. The DID 514 is suitably any networked DID as will be appreciated to one of ordinary skill in the art. However, it should be noted that while the preferred embodiment of the present invention is a network system having a Thick Client and a DID, the present invention includes systems having a DID and personal computer connected directly to one another through a port such as a parallel port, serial port, USB port, or any other data transport mechanism as will also be apparent to one of ordinary skill in the art.

The DID 510 preferably has an internal device controller 512 suitably acting as a fully functional server with the necessary hardware and software that ensure proper operation of the DID 510 as will be appreciated by those skilled in the art. In addition, the DID 510 preferably comprises internal storage 516, which is suitably a hard disk and random access memory ("RAM") as will be appreciated by those skilled in the art. Preferably stored on storage 516 are the RQ file 520 and at least one software module or software component 518.

As will be appreciated by those skilled in the art, the RQ file 520 is suitably any form of file capable of storing configuration information, may be a single file or a plurality of files, and preferably comprises a plurality sections. The RQ file is preferably a text-based file, such as a simple text file, an hypertext markup language file ("HTML"), an extensible markup language ("XML") file, etc., or is also suitably a database or database file, or any other searchable file as will be appreciated by those skilled in the art.

One or more of the software components of software component 518 preferably receives job requests, creates a table for storing computed values associated with job requests, and saves job requests in the RQ file. The software component 518 is preferably a software component, which is an object-oriented program that is platform independent. In addition, the software component 518 suitably a plurality of software modules or software components, and suitably comprises either compiled or interpreted code. Preferably, the software component 518 is any piece of prewritten code that defines interfaces which can be called to provide the functionality that the component encapsulates. The software component 518 is preferably callable from multiple languages, or from multiple environments, or OS. It should be noted that the software component 518 of the present invention is suitably designed for any language binding, such as Common Object Request Broker Architecture ("CORBA"), NET, COM, DCOM, C++, ActiveX, etc., as will be appreciated by those skilled in the art.

In the presently preferred embodiment of the invention, job request is sent preferably from the Client 502 to the DID 510 across the data transport network 500. For example, a user of Client 502 sends a print job request through the use of a DID driver 506, such as a printer driver, across data transport network 500 via network interface 508. In addition, the print job request is preferably sent by a software program, such as a word processing program or automation program, or by any other computer or user connected to the data transport network 500.

The print job request is preferably received by a software component 518 that is preferably stored on storage 516 of the DID 510. One or more software components then suitably perform the processes described in FIGS. 1–4 as appropriate. In the presently preferred embodiment, the software component 518 comprises a core class for performing the following functions: creating the RQ file 520, opening and reading the RQ file 520, building the table as a three-column array, adding sections to the table, adding new job requests and adding keys to the new job requests, setting values for newly added keys, removing job requests from the table, removing sections from the table, and storing the information contained in the table to the RQ file 520.

The software component 518 in the presently preferred embodiment also comprises a computation class for performing the function of converting section and key combinations to computed values (hash codes).

In addition, the software component 518 in the presently preferred embodiment comprises an interface class that contains the interfaces for clients. The interface class suitably uses the core class to create functionality and preferably permits functionality that comprises: table initialization, setting values, getting values, storing the table to the RQ file, and enumerating keys, all of which are preferably performed in real time.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A method for handling job requests for a multi-function digital image device comprising the steps of:
    storing job requests in a section of file-based job request file associated with a job queue corresponding to at least one document processing operation, which job request file has a plurality of sections, each section corresponding to a job type;
    assigning a job request key to each job request that is unique at least within its section;
    computing from the job request key, a computed value for each job request, the computed value including a section value, job request key data and a hash code calculated in accordance with the section value and the job request key;
    storing the computed values in the job request file; and
    searching stored values to determine the state of the job request file.

2. The method of claim 1 wherein the job requests are selected from a group consisting of: print requests, private print requests, fax requests, and scan requests.

3. The method of claim 1 further comprising the step of storing section headers in the file-based job request queue.

4. The method of claim 3 further comprising the steps of computing section header values from the section headers, and storing the section header values.

5. The method of claim 3 wherein values for each job request are computed from a string comprising the section header of the section in which the job request is stored and the key assigned to the job request.

6. The method of claim 3 further wherein searching stored values to determine the state of the queue comprises the step of locating a section header values to determine the location of a job request.

7. The method of claim 1 wherein the file-based job request queue is a text file.

8. The method of claim 1 wherein the key is an eight digit string.

9. The method of claim 1 further comprising the step of storing ajob value in the file to monitor the number of job requests in the file-based job request queue.

10. The method of claim 9 further comprising the step of incrementing the job value upon receipt of a new job request.

11. The method of claim 9 wherein the key is based on the job value.

12. The method of claim 9 wherein the job value is stored separately from all stored job requests in a job value section of the file-based job request queue.

13. The method of claim 1 wherein the computed values are stored in cache memory.

14. The method of claim 1 wherein the step of storing the computed values comprises the step of building an array for storing the computed values.

15. The method of claim 14 wherein the array is an associative array.

16. A system for handling job requests for a multi-function digital imaging device comprising:
   a file-based job request file associated with a job queue corresponding to at least one document processing operation comprising:
   a plurality of sections for storing keys, each section corresponding to a job type, and
   at least one job request key in a section that is unique at least within its section, the job request key representing a job request;
   means adapted for assigning a job request key to each job request such that the job request key is unique at least within its section;
   means adapted for computing from the job request key, a computed value for each job request, the computed value including a section value ,job request key data and a hash code calculated in accordance with the section value and the job request key;
   means adapted for storing the computed values in the job request file; and
   means adapted for searching the stored computed values to determine the state of the job request file.

17. The system of claim 16 wherein the job requests are selected from a group consisting of: print requests, private print requests, and scan requests.

18. The system of claim 16 wherein the file-based job request queue further comprises section headers.

19. The system of claim 18 further comprising a means adapted for computing from section headers a value for each section header.

20. The method of claim 19 wherein values for each job request are computed from a string comprising the section header and the key assigned to the job request.

21. The method of claim 19 wherein the means for searching the stored computed values to determine the state of the queue comprises a means for locating a section header computed value to determine the location of a value computed from a job request.

22. The system of claim 16 wherein the file-based job request queue is a text file.

23. The system of claim 22 wherein the key is an eight digit string.

24. The system of claim 22, wherein the file-based job request queue further comprises a job value corresponding to the number of job requests in the queue.

25. The system of claim 24 wherein the job request key is based on the job value.

26. The system of claim 24 wherein the file-based job request queue further comprises a job value section for storing a job value.

27. The system of claim 16 wherein the computed values are stored in cache memory.

28. The system of claim 16 computed values are stored in an affay.

29. The system of claim 28 wherein the array is an associative array.

30. A system for storing job requests for a multi-function digital image device comprising:
   a file, associated with a job queue corresponding to at least one document processing operation, having a plurality of job request sections for storing job requests, each job request section having a header and each stored job request having a key;
   an array for storing a plurality of values computed from keys of stored job requests the computed values including a section value, job request key data and a hash code calculated in accordance with the section value and the key;
   a core software component having functionality for:
   assigning a job request key to each job request such that the job request key is unique at least within its section,
   storing in the away values computed from job request keys, and
   searching the stored computed values to determine the state of the job request file; and
   a computation software component having functionality for computing from the job request key a value for each job request.

31. The system of claim 30 further comprising an interface software component having functionality for calling the core software component.

* * * * *